April 6, 1937. V. H. HURT 2,075,945
RUBBER SHEET MATERIAL AND ARTICLE MADE THEREFROM
Filed March 3, 1936

INVENTOR.
VICTOR H. HURT
BY
ATTORNEY.

Patented Apr. 6, 1937

2,075,945

UNITED STATES PATENT OFFICE 2,075,945

RUBBER SHEET MATERIAL AND ARTICLE MADE THEREFROM

Victor H. Hurt, Naugatuck, Conn., assignor to United States Rubber Products, Inc., New York, N. Y., a corporation of Delaware Application March 3, 1936, Serial No. 66,801

14 Claims. (Cl. 41—21)

This invention relates to rubber sheet material and more particularly to perforate sheet material and articles made therefrom.

In addition to the conventional method of mechanically perforating in the desired design, a calendered rubber sheet or rubber sheet material made directly from a solvent solution or aqueous dispersion of rubber, perforate rubber films or sheets have been made by spreading latex on to a metal backing to dry and when at least partially dried or set, impressing a patterned plate on the spread film to form perforations corresponding to raised portions on the plate. Rubber sheetings containing perforations have also been made by spreading latex on a suitably engraved plate, removing the latex from the relief parts of the plate by flowing or by the application of a squeegee and then allowing the latex to dry. Instead of an engraved plate, a mold with suitably spaced projections on the surface has been used. Another method for producing perforate rubber material is to spread a latex of fairly high viscosity on a perforated deposition backing and concurrently drying the spread rubber composition and forcing a gas through the perforations in the backing and through the rubber composition to form permanent perforations in the rubber film which is removed from the backing after drying. A still further method of making perforate rubber material in a wide variety of designs and simulating fabric materials is disclosed in my Patent No. 2,032,935 granted March 3, 1936 wherein latex and a coagulant are sprayed on to an open work fabric material or a negative of such material so that the latex will deposit on the impervious portions of the fabric backing and the spray will go through the perforations in the backing, thus forming a perforate rubber sheet which may be dried and removed from the backing.

According to the present invention, there is produced a perforate rubber material of enhanced appearance and with one or both surfaces made in the desired design and color combinations. Where the material is to be made up into a bathing suit, for example, the garment may be made reversible with an entirely different pattern on its two surfaces and yet retain the porosity which is so desirable in this type of article. The accompanying drawing illustrate but one embodiment of the present invention in which.

Figure 1:
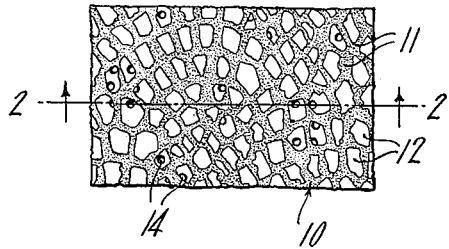
Figure 1 shows one surface of a sample of material made according to the present invention.

In carrying out the present invention, sheets or films of perforate rubber material, which may be made by any of the known methods but which are preferably made according to the process of my prior Patent No. 2,032,935 are plied together to form a laminated material with perforations in one layer and material surrounding these perforations visible through perforations in an adjacent layer. In this manner, the portions of the material of the first layer which are visible through the perforations of the second layer form a background for the material of the second layer while the laminated sheet retains at least some of the porosity of the first layer. Preferably the perforations in the first layer are smaller than the perforations in the second layer in order to obtain a greater contrast when viewing the material from the surface having the larger perforations, particularly when the layers are of different colors. One embodiment of the invention will be described in detail with reference to the drawing, but such is intended to be merely illustrative of the invention since other methods than that described may be utilized for making the perforate rubber plies, and the number of layers or plies may be increased as desired to give varied effects on one or both surfaces of the laminated product.

Accordingly, the desired number of layers necessary for the finished article and of the desired design are made on separate deposition backings which are preferably made of rubberized open work fabric treated as by halogenation or oxidation to form a deposition surface from which a coagulated latex deposit may easily be removed. The backings or masters may be of untreated fabrics or rubber negatives of such fabrics, the rubber negatives, if used, being preferably treated by halogenation or oxidation as above described with reference to the rubber coated fabric masters. In making a two-ply laminated material, as illustrated, the perforations in one sheet are preferably larger than the perforations in the other sheet in order to give the desired contrasting effect on at least one face of the finished material. The plies need not necessarily have an over-all perforate design and if desired, one or both deposition backings may have imperforate masks of fabric, paper, rubber or the like applied thereto in a desired design, or the perforations in desired portions of the backing may be filled over with an adhesive rubber composition or a paint to produce imperforate decorative effects in various portions of either or both layers of the finished product. On each deposition backing is built up a perforate film of the desired gauge and color by spraying on to the deposition backing a latex containing vulcanizing ingredients and of such viscosity and at such a rate that it does not web over the perforations of the backing, and a latex coagulant in alternate operations, as described in my Patent No. 2,032,935. After the latex on the backings has coagulated but before the coagula have completely dried, the two deposition backings or masters are placed together with the latex deposit on one in contact with the latex deposit on the other and the masters with the latex deposit between them are rolled as with squeeze rolls in order to unite the two latex surfaces firmly together. The masters are then carefully separated, leaving the double perforate rubber sheet on one master or the other. In case a third perforate rubber ply is to be incorporated in the laminated product, a perforate rubber film similarly produced on a third master may be plied with the already double rubber sheet in a manner similar to the first plying operation and such operations may be repeated for as many laminations as may be necessary to obtain the desired result in the finished product. The plied product remaining on a single master may then be dried, stripped from the backing before or after curing.

Figure 4:
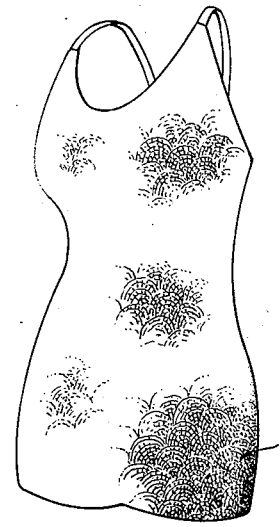
Figure 4 illustrates a bathing suit with the exposed surface of the garment being the face of the material shown in Figure 1.
Figure 2:
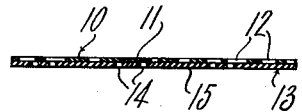
Figure 2 is a section on line 2—2 of Figure 1.
Figure 3:
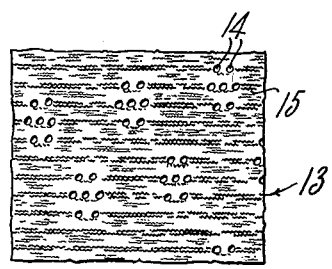
Figure 3 shows the opposite face of the material.
Figure 5:
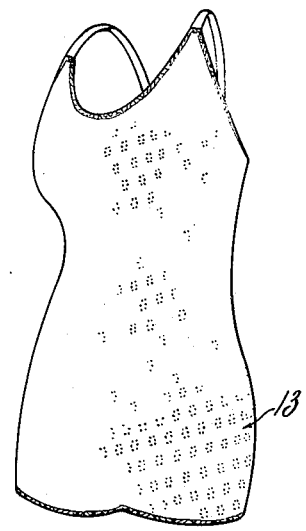
Figure 5 illustrates the bathing suit of Figure 4 reversed with the exposed surface of the garment being the face of the material shown in Figure 3.

Referring more particularly to the drawing, Figures 1 to 3 illustrate a two-ply material made in this manner. One layer or ply 10 is of a very coarse lacy design which of itself has very little resistance to rupture on stretching due to the narrow webs of material 11 between the large perforations 12. The other layer 13 has few perforations 14 and a large amount of material 15 between the perforations in order to give the desired strength to the laminated material. The material 15 has imparted to it a fabric-like finish due to the process of depositing the latex on a fabric or fabric negative, whereby the imperforate fabric construction is imparted to the separated rubber film as well as the perforations corresponding to openings in the fabric. The material of layer 10 likewise has a similar fabric-like finish but its effect is overshadowed by its open structure. The material 15 as viewed in Figure 1 forms a contrasting background for the raised design of the more porous ply 10 and at the same time a large proportion of the perforations 14 are visible through perforations of the layer 10 and thus maintain the desired porosity in the finished article. Those perforations 14 which are not visible through the perforations 12 are of course covered by the material 11. Assembled articles such as bathing suits may be made from the laminated sheet material in the usual manner of assembling rubber articles from sheet stock, namely, by cutting out the various parts in the desired pattern and adhesively joining them by pressure or cement and vulcanizing, if not previously vulcanized in sheet form, or by cementing the cut out parts together if the sheet material has been previously vulcanized. Figures 4 and 5 illustrate a reversible bathing suit made with the laminated material of Figures 1 to 3 with the ply 10 of a contrasting color from the ply 13. When the suit as shown in Figure 4 is worn with the ply 10 outermost, the suit has a decorative lace effect in the color of the material of the layer 10 with a background of the color of the material of the layer 13. When the suit as shown in Figure 5 is worn with the layer 13 outermost, the garment has the appearance of a single colored material in the color of the material of layer 13 and with perforations therein, the garment of course retaining at least in part, the porosity of the layer 13. If desired, of course, a second very porous and lace-like rubber film similar to the layer 10, but of a different design, may be plied to the surface of layer 15 as exposed in Figure 3 and thereby two decorative surfaces of contrasting color effect might be produced. Other articles such as corsets, girdles and the like may be made from the materials of the present invention, and the materials may be further used as covers for stuffed cushions, for porch furniture and other outdoor uses.

The term "latex" in the description and claims is intended to designate broadly coagulable dispersions of elastic materials including artificial dispersions of rubber or rubber-like materials as well as natural latex which may be preserved or compounded or otherwise treated as desired and which may be in a normal, diluted, concentrated or purified condition produced by methods well-known in the art.

With the above detailed disclosure of the invention, it is evident that numerous modifications will disclose themselves to those skilled in the art and it is not desired to limit the invention otherwise than as set forth in the appended claims.

Having thus described my invention, what I claim and desire to protect by Letters Patent is:

1. A laminated material comprising plied layers of sheet rubber material containing perforations therein, with material surrounding perforations in one layer being visible through perforations in an adjacent layer.

2. A laminated material comprising plied layers of sheet rubber material containing perforations therein, with some perforations in one layer and material surrounding said perforations being visible through larger perforations in an adjacent layer.

3. A laminated material comprising plied layers of sheet rubber material containing perforations therein, with material surrounding perforations in one layer being visible through perforations in an adjacent layer, and with the material of said adjacent layers being of different colors.

4. A laminated material comprising plied layers of sheet rubber material containing perforations therein, with some perforations in one layer and material surrounding said perforations being visible through larger perforations in an adjacent layer, and with the material of said adjacent layers being of different colors.

5. A laminated material comprising plied layers of sheet rubber material of the direct deposit of solids of rubber latex and containing perforations therein, with material surrounding perforations in one layer being visible through perforations in an adjacent layer.

6. A laminated material comprising plied layers of sheet rubber material of the direct deposit of solids of rubber latex and containing perforations therein, with some perforations in one layer and material surrounding said perforations being visible through larger perforations in an adjacent layer.

7. A laminated material comprising plied layers of sheet rubber material of the direct deposit of solids of rubber latex and containing perforations therein, with material surrounding perforations in one layer being visible through perforations in an adjacent layer, and with the material of said adjacent layers being of different colors.

8. A laminated material comprising plied layers of sheet rubber material of the direct deposit of solids of rubber latex and containing perforations therein, with some perforations in one layer and material surrounding said perforations being visible through larger perforations in an adjacent layer, and with the material of said adjacent layers being of different colors.

9. A laminated material consisting of two plied layers of different colored sheet rubber material containing perforations therein, with some perforations in one layer and material surrounding said perforations being visible through perforations in the other layer, the perforations in the first layer being sufficiently small that the outer surface thereof has the appearance of a single colored material with perforations therein, and the perforations in the other layer being sufficiently large to produce a two colored decorative effect with the color of said first layer as a background.

10. A laminated material consisting of two plied layers of different colored sheet rubber material of the direct deposit of solids of rubber latex and containing perforations therein, with some perforations in one layer and material surrounding said perforations being visible through perforations in the other layer, the perforations in the first layer being sufficiently small that the outer surface thereof has the appearance of a single colored material with perforations therein, and the perforations in the other layer being sufficiently large to produce a two-colored decorative effect with the color of said first layer as a background.

11. A reversible rubber bathing garment composed of a laminated sheet rubber material with perforations in each layer thereof, some of the perforations in one layer and material surrounding said perforations being visible through larger perforations in an adjacent layer, the material of said layers being of different colors whereby the outer surface of said second layer has a decorative effect in the color of said second layer with a background of the color of the material of said first layer, the garment retaining at least in part the porosity of said first layer.

12. A reversible rubber bathing garment composed of a laminated sheet rubber material of the direct deposit of solids of rubber latex with perforations in each layer thereof, some of the perforations in one layer and material surrounding said perforations being visible through larger perforations in an adjacent layer, the material of said layers being of different colors whereby the outer surface of said second layer has a decorative effect in the color of said second layer with a background of the color of the material of said first layer, the garment retaining at least in part the porosity of said first layer.

13. A reversible rubber bathing garment composed of a two-ply laminated sheet rubber material with perforations in each layer thereof, some of the perforations in one layer and material surrounding said perforations being visible through larger perforations in the other layer, the material of said layers being of different colors, the perforations in the first layer being sufficiently small so that the bathing garment, when worn with the outer surface of the first layer as the exposed surface of the garment has the appearance of a single colored material with perforations therein, and the perforations in the second layer being sufficiently large so that the bathing garment, when worn with the outer surface of the second layer as the exposed surface of the garment has a decorative effect in the color of the material of the second layer with a background of the color of the material of the first layer, the garment retaining at least in part the porosity of said first layer.

14. A reversible rubber bathing garment composed of a two-ply laminated sheet rubber material of the direct deposit of solids of rubber latex with perforations in each layer thereof, some of the perforations in one layer and material surrounding said perforations being visible through larger perforations in the other layer, the material of said layers being of different colors, the perforations in the first layer being sufficiently small so that the bathing garment, when worn with the outer surface of the first layer as the exposed surface of the garment has the appearance of a single colored material with perforations therein, and the perforations in the second layer being sufficiently large so that the bathing garment, when worn with the outer surface of the second layer as the exposed surface of the garment has a decorative effect in the color of the material of the second layer with a background of the color of the material of the first layer, the garment retaining at least in part the porosity of said first layer.

VICTOR H. HURT.